United States Patent [19]

Knothe et al.

[11] Patent Number: 4,666,007

[45] Date of Patent: May 19, 1987

[54] DRYING BALANCE WITH SCALE ON TOP

[75] Inventors: Erich Knothe, Eddigehausen; Franz-Josef Melcher, Hardegsen; Günther Maaz, Uslar; Volker Handwerk, Bovenden, all of Fed. Rep. of Germany

[73] Assignee: Sartorius GmbH, Fed. Rep. of Germany

[21] Appl. No.: 861,397

[22] Filed: May 9, 1986

[30] Foreign Application Priority Data

May 11, 1985 [DE] Fed. Rep. of Germany ....... 3517052

[51] Int. Cl.⁴ ..................... G01G 19/00; G01G 21/28; G01N 25/56
[52] U.S. Cl. .................................. 177/245; 177/180; 73/76; 374/14
[58] Field of Search ....................... 177/180, 200, 245; 374/14; 73/76

[56] References Cited

U.S. PATENT DOCUMENTS

| 2,667,064 | 1/1954 | Andersen et al. | 73/76 |
| 2,765,160 | 10/1956 | Dietert et al. | 177/245 X |
| 2,792,706 | 5/1957 | Mauret | 73/76 |
| 4,165,633 | 8/1979 | Raisanen | 177/245 X |
| 4,291,775 | 9/1981 | Collins | 177/245 X |
| 4,606,650 | 8/1986 | Harris | 177/245 X |

FOREIGN PATENT DOCUMENTS

| 0913591 | 5/1954 | Fed. Rep. of Germany | 73/76 |
| 0604863 | 7/1948 | United Kingdom | 73/76 |

Primary Examiner—George H. Miller, Jr.
Attorney, Agent, or Firm—Eric P. Schellin

[57] ABSTRACT

In a drying balance with scale on top and with a radiation source for heating and drying material to be weighed located on the balance scale, the radiation source (11) is permanently located behind the balance scale (5) and a bent cover (7) which functions as a radiation deflector is movably located over the balance scale (5). This makes the construction lower and a moving of the radiation source (11) with its electric connections is avoided when the balance scale (5) is loaded. Moreover, differently constructed inner surfaces (7') of the cover (17) permit the drying balance to easily adapt to different radiation sources (11) and to different drying tasks.

12 Claims, 4 Drawing Figures

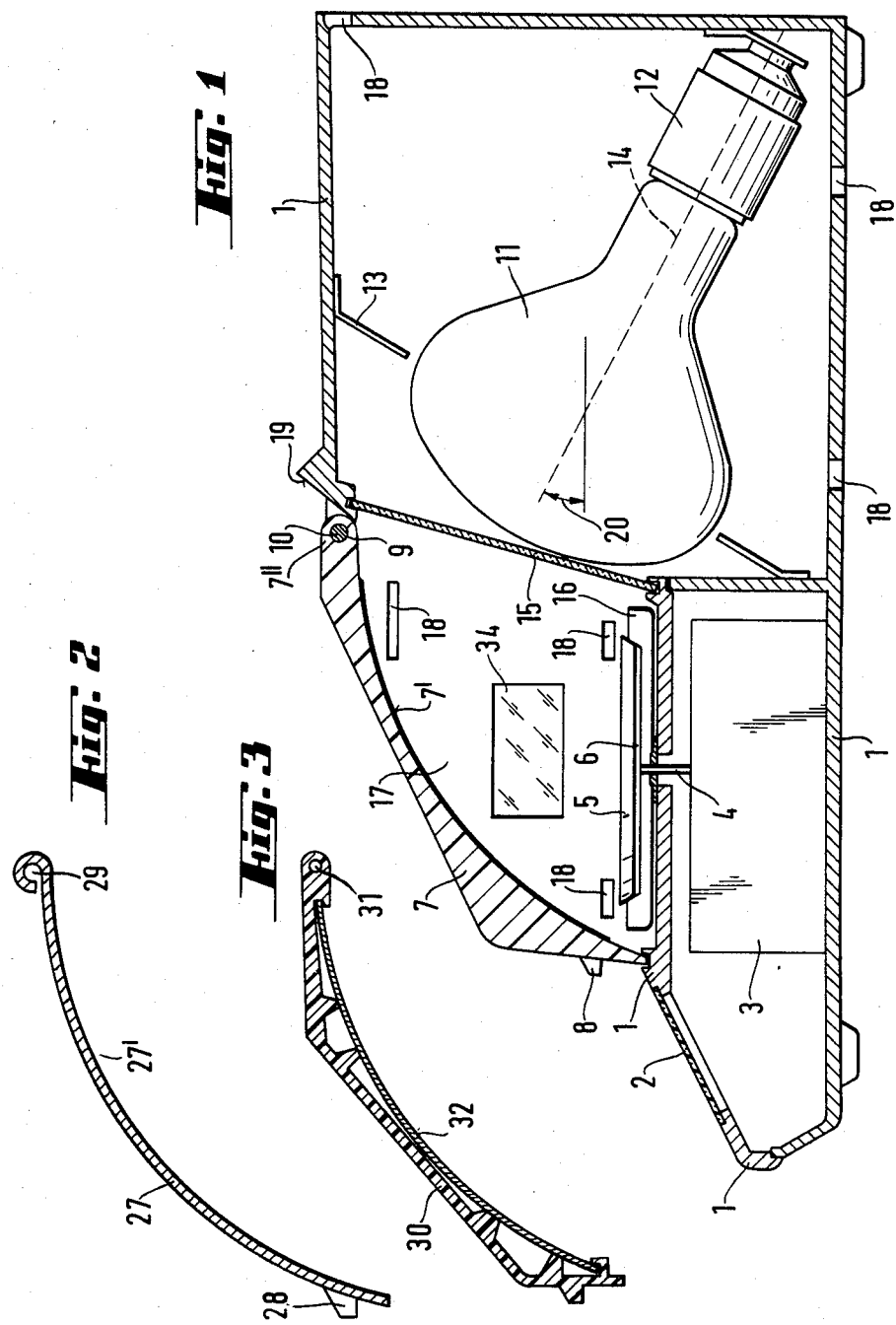

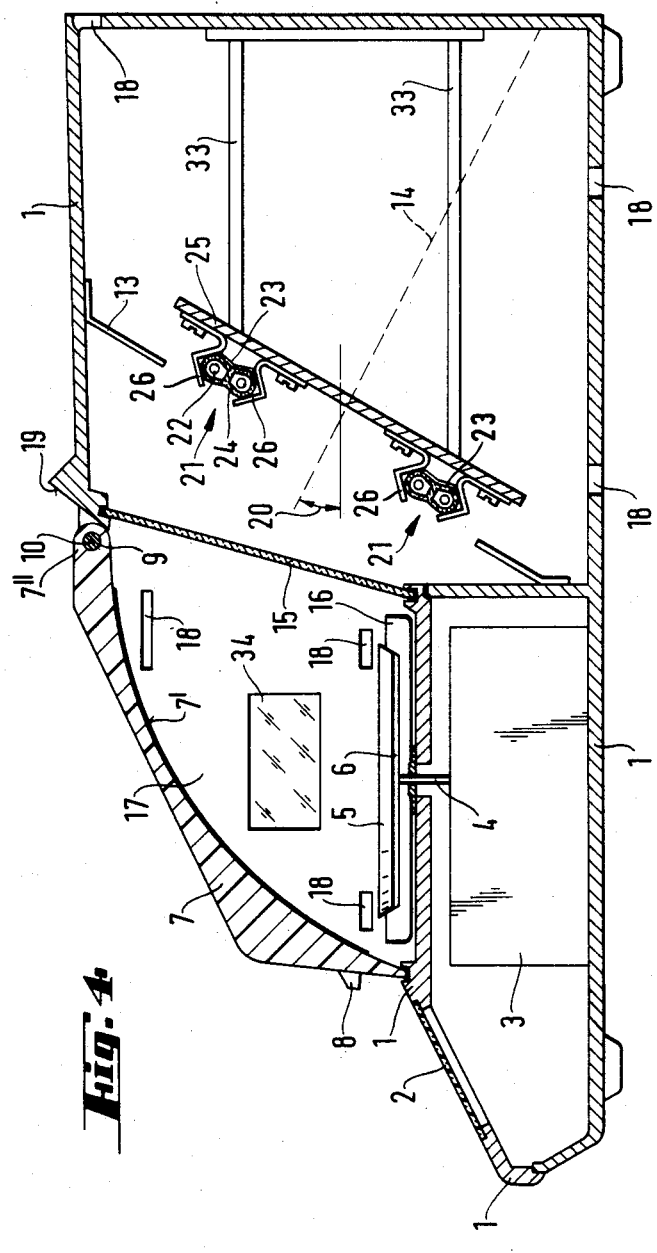

DRYING BALANCE WITH SCALE ON TOP

BACKGROUND OF THE INVENTION

The invention relates to a drying balance with a scale on top, including a radiation source for heating and drying the material to be weighed located on the balance scale.

Mechanical and electronic balances of this type are generally known. The radiation source, usually in the form of an infrared lamp, a ceramic projector or a quartz projector, is attached vertically over the balance scale and can be folded up/back for loading the balance scale.

A disadvantage of this arrangement, in addition to the great height of the construction, is the fact that in order to load the balance, the entire radiation source with its electric connections must be moved.

The invention therefore has the task of indicating a construction for a drying balance with a scale on top of the type initially mentioned which is low in height and in which the balance scale can be made accessible without moving the radiation source.

BRIEF DESCRIPTION OF THE INVENTION

The invention achieves this task as follows: The radiation source is permanently positioned behind the balance scale and a bent cover which functions as a radiation deflector is movably attached over the balance scale.

Thus, in order to load the balance scale, only the light cover needs to be moved, which requires no electric connections.

This cover consists of a metallic material such as high-grade steel, for example, which can be highly polished or unpolished, as required, on the side facing the balance scale and the radiation source. The highly polished inner surface acts as a mirror and can reproduce the radiation source optically onto the balance scale, whereby an enlargement or reduction is also possible, depending on the geometric arrangement. In contrast thereto, an unpolished inner surface acts as an additional radiation diffusor, whereby an approximately even irradiation of the specimen on the balance scale can be achieved even in the case of an uneven distribution of the radiation of the radiation source.

In another advantageous embodiment, the cover consists of a non-metallic work material, e.g. plastic, and carries a reflecting coat on its side facing the balance scale and the radiation source. This coat can consist of metal foil or can be deposited by evaporation. In the case of a vapor-deposited coat, this coat can also consist of several layers as a dielectric mirror and thus selectively reflect only the radiation of a certain wavelength range while the other wavelength ranges are let through. In this manner, the spectral distribution of radiation on the specimen on the balance scale can be influenced not only by the selection of a suitable radiation source but also by the arrangement of the dielectric mirror, which allows a better adaptation to the absorption spectrum of the specimen to be achieved. The inner surface of the cover can also be constructed in such a manner that it acts in a reflecting manner for the heat radiation of the radiation source, while it is permeable to a great extent for radiation in the visible range, so that it is possible to visually observe the specimen through the cover.

The form of the inner surface of the cover can also be constructed in different ways, also as required. An inner surface in the form of a spherical segment achieves an approximate optical reproduction of the radiation source onto the balance scale, which results in the best efficiency. In contrast thereto, a cylindrically bent inner surface of the cover can distribute the radiation of a radiation source with a very small area over the entire width of the balance scale. In addition, this form is simpler to manufacture. Thus, the arrangement of the radiation source of the invention and the use of a cover with a reflecting inner surface offer, taken together, the additional possibility of an easy adaption of the drying balance to different types of radiation sources and different drying tasks.

The cover is fastened to the housing with advantage at the upper/back end of the cover in an axis of rotation, so that the cover can be folded up about this axis of rotation for loading the balance scale.

The radiation source is located with advantage behind the balance scale and slightly inclined to the horizontal, whereby this angle of inclination is advantageously 10°–40°. This angle of inclination offers the best possibility of combining a good utilization of space and the optical requirements.

The radiation source is advantageously in the form of an infrared lamp, a ceramic projector or quartz projectors.

BRIEF DESCRIPTION OF THE DRAWINGS

The invention is described below in an embodiment given by way of example with reference made to the figures.

FIG. 1 shows a cross section through the drying balance.

FIG. 2 shows another embodiment of the cover.

FIG. 3 shows a further embodiment of the cover.

FIG. 4 shows an embodiment of the drying balance with quartz projectors.

DETAILED DESCRIPTION OF THE INVENTION

The drying balance with scale on top of FIGS. 1 and 4 consists of multipartite housing 1 in which weighing system 3 is housed. The type of this weighing system has no significance for the invention; for example, it can be a mechanical inclination system with optical projection scale or an electronic system in accordance with the principle of the electromagnetic compensation of force. Lower scale 6 is connected to weighing system 3 via power line 4. Balance scale 5 with the specimen to be dried and weighed rests in a removable manner on lower scale 6. Viewing window 2 is also integrated into housing 1 and permits the projected scale or the electronic display to be read. Radiation source 11, 21, sketched here as infrared lamp 11 or quartz projector 21, is located behind balance scale 5 and weighing system 3. Radiation source 11 is fixed to housing 1 by socket 12 and collar 13. Radiation source 11 is positioned so that its main direction of radiation 15 forms an angle 20 to the horizontal of approximately 10° to 40°. The area of the radiation source can be sealed as regards air currents against weighing area 17 by wall 15, which is permeable to heat radiation. The ventilation and cooling of radiation source 11 is assured by holes 18 in the bottom, back side and/or top of housing 1. Weighing area 17 can be ventilated and vented in the same manner by holes 18.

In addition, the drying balance comprises cover 7, which is manufactured from plastic in the embodiment of FIG. 1 and has a reflecting coat on an inner side 7'. Cover 7 comprises a through hole 9 in its upper back end through which spindle 10 fixed to the housing extends. In this manner, cover 7 is pivotably mounted at this end, and when opened, it comes to rest against stop 10 on the housing. Handle 8 is for grasping the cover during opening and closing.

Finally, FIG. 1 shows protective sheets 16 which protects housing 1 against heat radiation next to balance scale 5 and also makes it easier to clean any specimen material which falls down.

FIGS. 2, 3 show two other embodiments of the cover. In FIG. 2, cover 27 consists of high-grade steel sheet. Inner surface 27' acts as a reflector for heat radiation. Hole 29 for pivotable attachment is manufactured simply by flanging. Handle 28 consists, for example, of plastic.

In FIG. 3, the cover consists of plastic part 30, which again comprises a hole 31 for receiving the pivot shaft, and of metallic mirror 32 set into corresponding grooves in plastic part 30.

FIG. 4 shows another embodiment of the drying balance. Parts with the same reference numerals in FIGS. 1, 4 represent the same parts. FIG. 4 differs from FIG. 1 by the use of two quartz projectors 21 as radiation source. Quartz projectors 21 consist of heated coils 22 in quartz tubes 24. The tubes comprise reflecting coat 23 on the back. They are fastened by holders 26 to carrier 25 and are connected by braces 33 to housing 1.

The type of reflecting coat depends in all embodiments, as initially mentioned, on the special requirements of the particular case. The drawings show only a cylindrically bent inner surface of the cover. However, any expert in the art can easily make the transfer to an inner surface shaped like a spherical segment.

For a better monitoring of weighing area 17, a window 34 is located in at least one of the walls to the side of cover 7, 27, 30/32, through which window the drying of the specimen can be monitored. Window 34 can be closed by a flap or slide.

We claim:

1. Drying balance with scale on top, with a radiation source for heating and drying the material to be weighed located on the balance scale, characterized in that the radiation source (11, 21) is permanently attached behind the balance scale (5) and that a bent cover (7, 27, 30/32) which functions as a radiation deflector is movably attached over the balance scale (5).

2. Drying balance with scale on top according to claim 1, characterized in that the cover (27) consists of a metallic work material.

3. Drying balance with a scale on top according to claim 2, characterized in that the cover (27) is highly polished on the side (27') facing the balance scale (5) and the radiation source (11, 21).

4. Drying balance with a scale on top according to claim 2, characterized in that the cover (27) is unpolished on the side (27') facing the balance scale (5) and the radiation source (11, 21).

5. Drying balance with scale on top according to claim 1, characterized in that the cover (7, 30/32) consists of a non-metallic work material and carries a reflecting coat (7', 32) on the side facing the balance scale (5) and the radiation source (11, 21).

6. Drying balance with scale on top according to claim 5, characterized in that the reflecting coat (7) reflects only certain wavelength areas.

7. Drying balance with scale on top according to claim 1, characterized in that the inner surface of the cover (7, 27, 30/32) represents a spherical segment.

8. Drying balance with scale on top according to claim 1, characterized in that the cover (7, 27, 30/32) comprises a cylindrically bent inner surface.

9. Drying balance with scale on top according to claim 1, characterized in that the cover (17) is fastened at or in the vicinity of its upper back end (7") to the balance housing (1) and can be folded up about this fastening as spindle (10).

10. Drying balance with scale on top according to claim 1, characterized in that the main direction (14) of radiation of the radiation source (11, 21) forms an angle (20) of 10°...40° to the horizontal.

11. Drying balance with scale on top according to claim 1, characterized in that the weighing area (17) can be viewed through a window (34) located to the side of the cover (7, 27, 30/32).

12. Drying balance according to claim 1, characterized in that the radiation source is in the form of an infrared lamp (11), a ceramic projector or of a multiple quartz projector (21).

* * * * *